(12) United States Patent
Wood

(10) Patent No.: US 11,192,483 B2
(45) Date of Patent: Dec. 7, 2021

(54) THIN PROFILE CABLE ATTACHMENT FOR A RECLINER LINK

(71) Applicant: Magna Seating Inc, Aurora (CA)

(72) Inventor: Meredith Wood, Howell, MI (US)

(73) Assignee: Magna Seating Inc., Aurora (CA)

(*) Notice: Subject to any disclaimer, the term of this patent is extended or adjusted under 35 U.S.C. 154(b) by 184 days.

(21) Appl. No.: 16/388,901

(22) Filed: Apr. 19, 2019

(65) Prior Publication Data

US 2019/0322201 A1 Oct. 24, 2019

Related U.S. Application Data

(60) Provisional application No. 62/660,559, filed on Apr. 20, 2018.

(51) Int. Cl.
*B60N 2/90* (2018.01)
*B60N 2/22* (2006.01)

(52) U.S. Cl.
CPC ............ *B60N 2/919* (2018.02); *B60N 2/22* (2013.01); *B60N 2002/971* (2018.02)

(58) Field of Classification Search
CPC ..... B60N 2/919; B60N 2/22; B60N 2002/971
See application file for complete search history.

(56) References Cited

U.S. PATENT DOCUMENTS

| | | | |
|---|---|---|---|
| 5,669,268 A * | 9/1997 | Tsai | B62K 23/06 74/489 |
| 5,910,193 A * | 6/1999 | Chen | G05G 1/04 74/489 |
| 7,992,913 B2 * | 8/2011 | Zelmanov | B60N 2/3031 296/65.05 |
| 8,016,354 B2 * | 9/2011 | Veluswamy | B60N 2/3011 297/320 |
| 8,210,614 B2 | 7/2012 | Shao | |
| 9,987,954 B2 | 6/2018 | Kimata | |
| 10,406,956 B2 * | 9/2019 | White | B60N 2/856 |
| 10,703,240 B2 * | 7/2020 | Di Giusto | B60N 2/686 |
| 2012/0228913 A1 * | 9/2012 | Hurst | B60N 2/20 297/354.12 |
| 2018/0050616 A1 * | 2/2018 | Nozue | B60N 2/933 |

FOREIGN PATENT DOCUMENTS

DE 102005001400 8/2015

* cited by examiner

*Primary Examiner* — Philip F Gabler
(74) *Attorney, Agent, or Firm* — Miller Canfield

(57) ABSTRACT

A cable assembly has a link, a cable connector and a cable. The link has a slot near a distal end of the link. The cable connector comprises a shaft near a proximal end of the cable connector and an opening near a distal end of the cable connector. The shaft is engaged with the slot of the link. The cable has a stopper at an end of the cable. The cable extends through the opening, and the stopper extends above the opening.

5 Claims, 4 Drawing Sheets

THIN PROFILE CABLE ATTACHMENT FOR A RECLINER LINK

CROSS-REFERENCE TO RELATED APPLICATIONS

This application claims priority to U.S. provisional patent application No. 62/660,559, filed Apr. 20, 2018, which is incorporated herein by reference.

FIELD OF THE INVENTION

The present invention relates to thin profile cable attachments that reduce the overall connection width, reduce buzz, squeak, and rattle, and are easy to manufacture and assemble.

BACKGROUND OF THE INVENTION

Cable assemblies consisting of a link, a cable connector and a Bowden-style cable are well known in the art. For example, FIGS. 1 and 2 illustrate a cable assembly 10 for use on a recliner 12 in an automotive vehicle in accordance with the prior art. The cable assembly 10 includes a recliner link 14, a cable connector 16 and a cable 18. The cable connector 16 is attached to the side of the recliner link 14, and thus is in an offset or cantilevered position. These cable connectors are bulky, difficult to package and are not very durable.

SUMMARY OF THE INVENTION

According to one embodiment, there is provided a cable assembly comprising a link, a cable connector and a cable. The link has a slot near a distal end of the link. The cable connector comprises a shaft near a proximal end of the cable connector and an opening near a distal end of the cable connector. The shaft is engaged with the slot of the link. The cable has a stopper at an end of the cable. The cable extends through the opening, and the stopper extends above the opening.

According to another embodiment, there is provided a cable connector for coupling a cable to a link comprising a shaft near a proximal end of the cable connector and an opening near a distal end of the cable connector. The shaft is rotatably coupled to the link. The cable extends through the opening.

According to another embodiment, there is provided a cable connector for coupling a cable to a link comprising an opening near a distal end of the cable connector. The cable extends through the opening. The cable connector is rotatably coupled to the link.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXAMPLE EMBODIMENTS

Figures 4, 5:
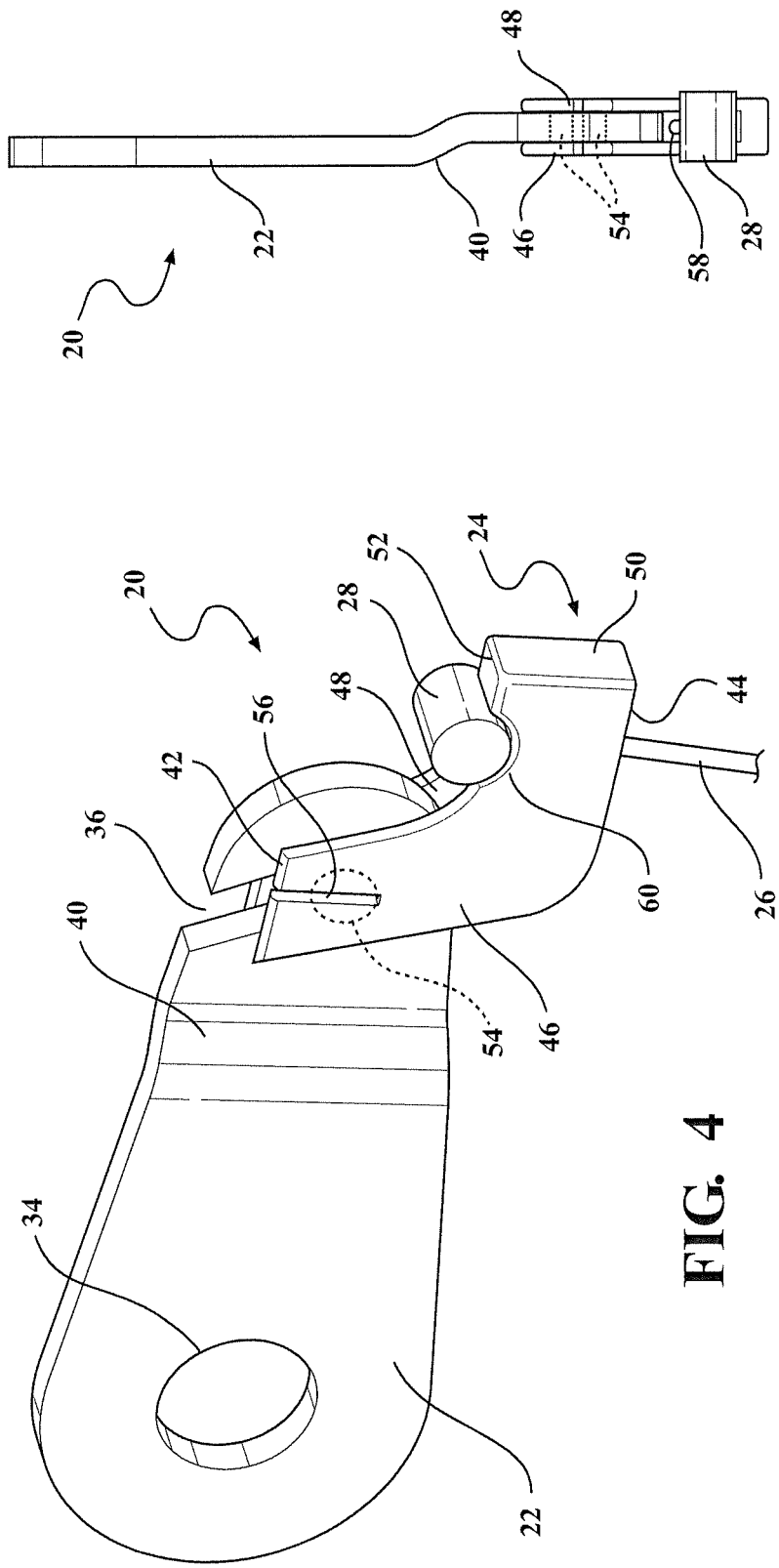
FIG. 4 is a perspective view of a cable assembly in accordance with one embodiment of the present invention.
FIG. 5 is a top view of the cable assembly of FIG. 4.

FIGS. 4-5 illustrate one embodiment of a cable assembly 20 in accordance with the present invention. Although described for use on a recliner in an automotive vehicle, the cable assembly 20 may be used for other applications and in other industries, without varying from the scope of the invention. The cable assembly 20 includes a recliner link 22, a cable connector 24, and a cable 26. The cable 26 includes a stopper 28 at the top, or distal end, of the cable 26.

Figure 2:
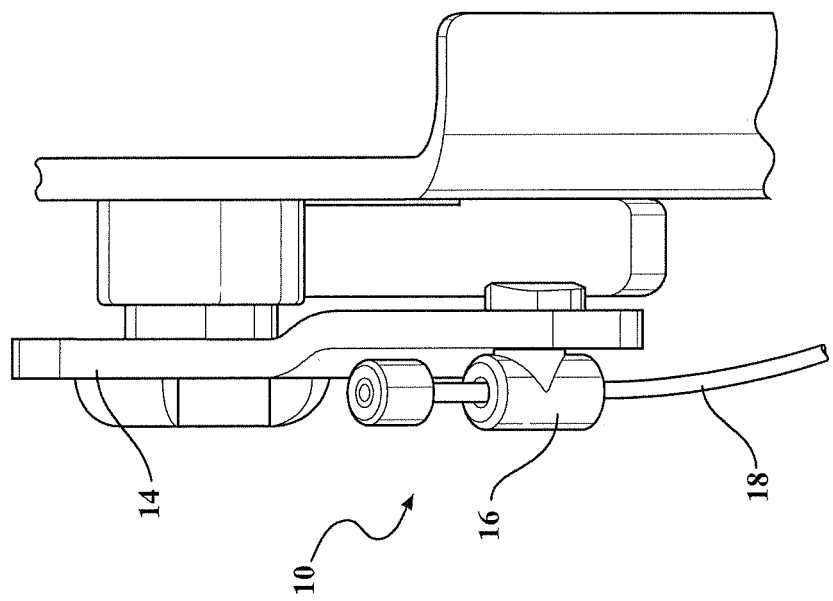
FIG. 2 is a front view of the seat assembly and cable assembly of FIG. 1.
Figure 1:
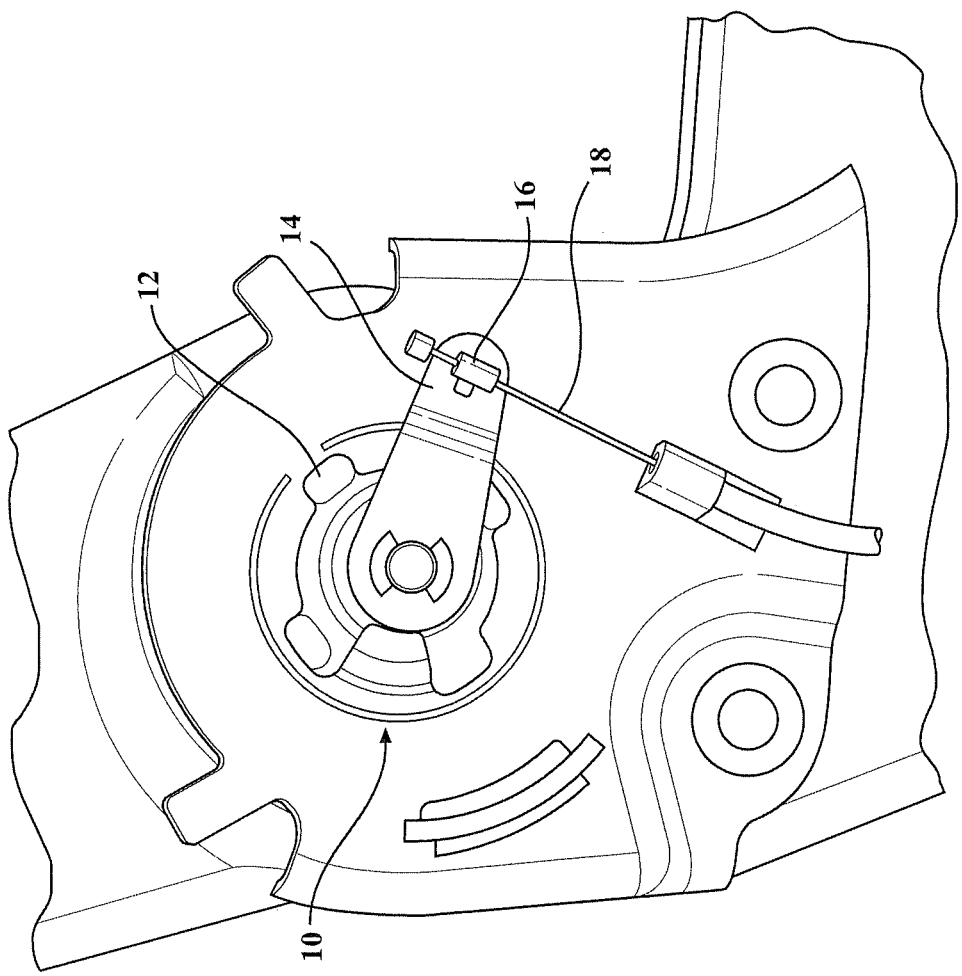
FIG. 1 is a side view of a seat assembly with a cable assembly in accordance with the prior art.
Figure 3:
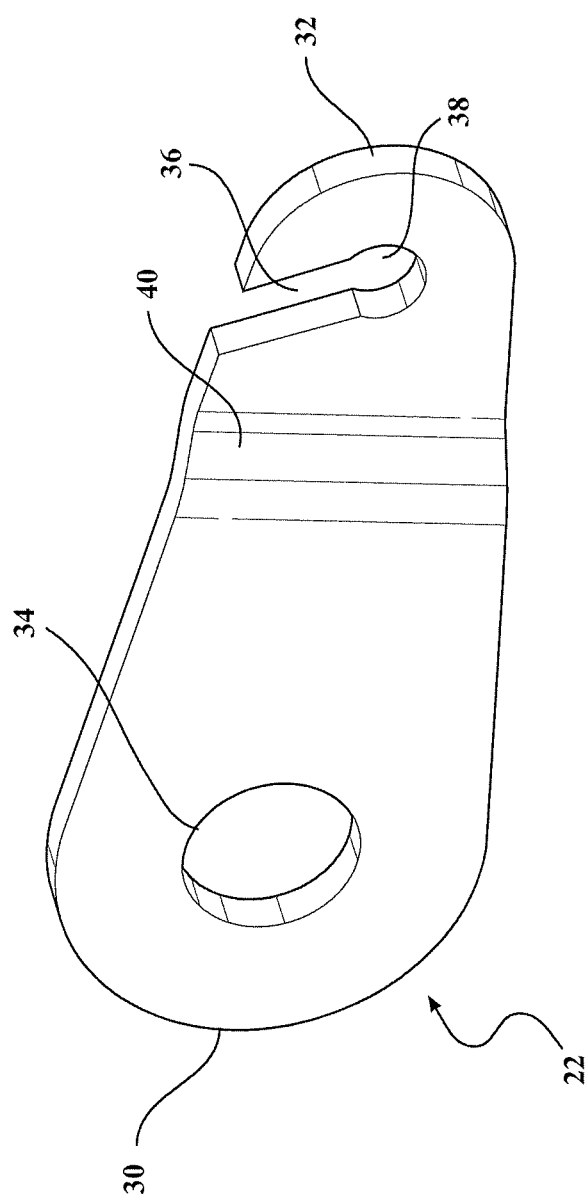
FIG. 3 is a perspective view of a recliner link in accordance with one embodiment of the present invention.

Referring to FIGS. 3-5, the recliner link 22 extends longitudinally between a proximal end 30 and a distal end 32. The recliner link 22 includes an opening 34 near the proximal end 30 for attachment to the recliner (not shown) to actuate the recliner between locked and unlocked conditions as is commonly known. The recliner link 22 also includes an elongated slot 36 near the distal end 32. The slot 36 includes a circular opening 38 at the inner end of the slot 36. The diameter of the circular opening 38 is greater than the width of the slot 36. The recliner link 22 includes an offset 40 to align with the recliner assembly, and minimize the lateral dimensions, or overall width, of the cable assembly 20.

The cable connector 24 extends longitudinally between a proximal end 42 and a distal end 44. The cable connector includes two spaced apart and parallel sidewalls 46, 48, a front wall 50 interconnecting the sidewalls 46, 48, and an upper lip 52. A shaft 54 (shown with hidden lines in FIG. 4) extends between the sidewalls 46, 48 near the proximal end 42 of the cable connector 24. The cable connector 24 also includes a transverse slot 56 at its proximal end 42 that extends through each sidewall 46, 48 and through the shaft 54 and divides the shaft 54 into two pieces, or halves. The diameter of the shaft 54 is greater than the width of the slot 36. By dividing the shaft 54 into two pieces, the shaft 54 may be compressed, during assembly to insert it into the slot 36 of the recliner link 22 until it reaches the circular opening 38 at the inner end of the slot 36. The expansion of the shaft 54 once it reaches the circular opening 38 locks the shaft 54 into the circular opening 38 of the slot 36. When the shaft 54 is in the circular opening 38 of the slot 36, the cable connector 24 is rotatably, or pivotally, coupled to the recliner link 22.

The cable connector 24 also includes an opening 58 at the distal end 44 thereof formed by the two spaced apart sidewalls 46, 48 and the front wall 50. The cable 26 extends through the opening 58 in the cable connector 24. The cable connector 24 also includes a groove 60 formed by recessed cutouts in the sidewalls 46, 48 for cradling the stopper 28.

Figure 7:
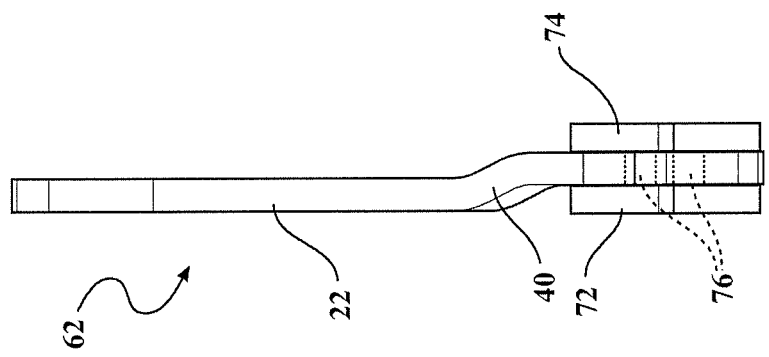
FIG. 7 is a top view of the cable assembly of FIG. 6.
Figure 6:
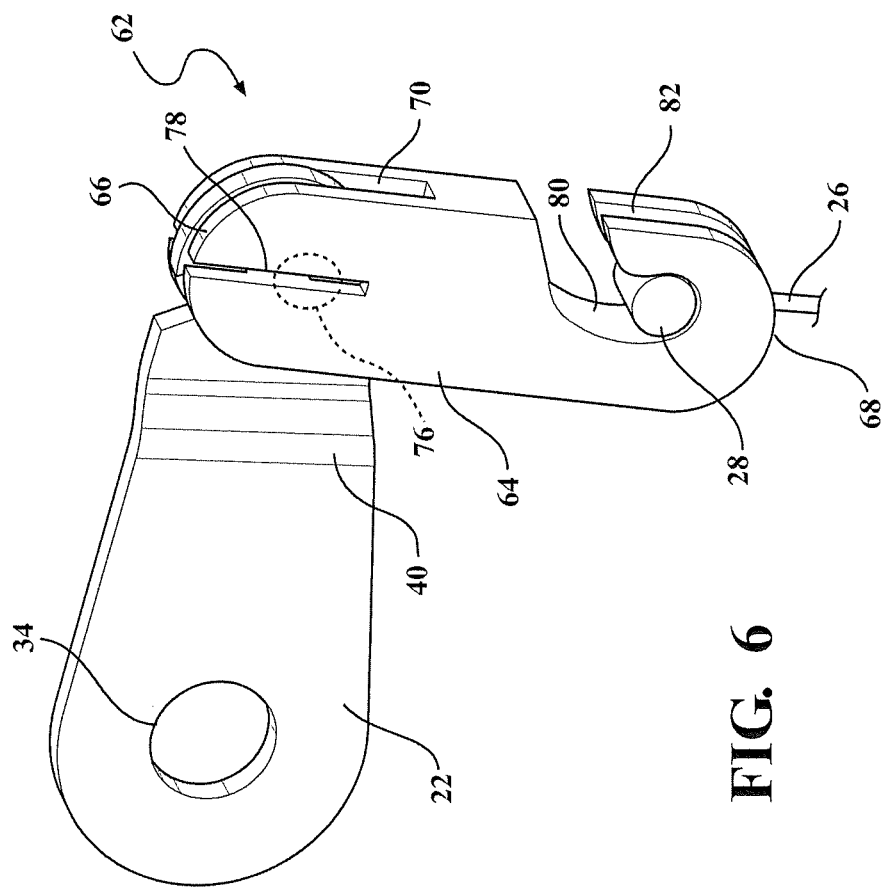
FIG. 6 is a perspective view of a cable assembly in accordance with a second embodiment of the present invention.

FIGS. 6-7 illustrate another embodiment of a cable assembly 62 in accordance with the present invention. The cable assembly 62 includes a recliner link 22 (described above), a cable connector 64, and a cable 26.

The cable connector 64 is an oblong shaped structure that extends longitudinally between a proximal end 66 and a distal end 68. The cable connector 64 includes a slot 70 that forms two spaced apart and parallel sidewalls 72, 74 at the proximal end 66 of the cable connector 64. A shaft 76 (shown with hidden lines in FIG. 6) extends between the sidewalls 72, 74 near the proximal end 66 of the cable connector 64. The cable connector 64 also includes a transverse slot 78 at the proximal end 66 that extends through each sidewall 72, 74 and through the shaft 76 and divides the shaft 76 into two pieces, or halves. The diameter of the shaft 76 is greater than the width of the slot 36 in the link 22. By dividing the shaft 76 into two pieces, the shaft 76 may be compressed during assembly to insert it into the slot 36 of the recliner link 22 until it reaches the circular opening 38 at the inner end of the slot 36. The expansion of the shaft 76 once it reaches the circular opening 38 locks the shaft 76 into the circular opening 38 of the slot 36. When the shaft 76 is in the circular opening 38 of the slot 36, the cable connector 64 is rotatably, or pivotally, coupled to the recliner link 22.

The cable connector 64 also includes a groove 80 near the distal end 68, and a slot 82 in a distal end of the groove 80. The cable 26 extends through the slot 82, and the stopper 28 rests in the groove 80 of the cable connector 64.

The cable assemblies 20, 62 in accordance with the present invention provide many benefits over prior art cable assemblies. As depicted in FIGS. 4 and 6, the cable connectors 24, 64 can position the cable 26 beyond the distal end 32 of the recliner link 22 and in the same plane as the recliner link 22, which can provide additional leverage, and thus require less effort, for actuating the recliner link 22. As depicted in FIGS. 5 and 7, the cable connectors 24, 64 also reduce the lateral width of the cable assemblies 20, 62. The lateral width reduction can improve the durability of the cable assemblies 20, 62 and improve clearances to other seat components, such as covers and shields. The cable connectors 24, 64 are easy to manufacture, assemble and replace. Also, the cable connectors 24, 64 only constrain the cable 26 in one direction, so a loss motion connection is provided between the cable 26 and the cable connector 24, 64 as is well known in the art to accommodate slack in the cable 26 during operation.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A cable connector for coupling a cable to a link comprising:
    first and second spaced apart and parallel sidewalls extending between a proximal end and an opposite distal end;
    a shaft near the proximal end of the cable connector adapted to be rotatably coupled to the link, the shaft extending laterally between and interconnecting the first and second sidewalls;
    an elongated slot extending through each of the first and second sidewalls from the proximal end through the shaft and dividing the shaft longitudinally into halves extending between the sidewalls to allow the halves to move relative to each other to vary the diameter of the shaft; and
    an opening near the distal end of the cable connector, wherein the cable is adapted to extend through the opening.

2. The cable connector of claim 1 further comprising a groove formed in an outer peripheral edge of each of the sidewalls adjacent the opening to engage and support a stopper at an end of the cable.

3. The cable connector of claim 2 wherein the halves of the shaft define an adjustable diameter.

4. The cable connector of claim 3 further including a front wall extend laterally between and interconnecting the first and second sidewalls.

5. The cable connector of claim 1 wherein the cable is coupled to the cable connector with a loss motion connection.

* * * * *